United States Patent
Meissner

(10) Patent No.: US 7,900,539 B2
(45) Date of Patent: Mar. 8, 2011

(54) CHAIN TENSION TOOL

(76) Inventor: Joseph E. Meissner, Thousand Oaks, CA (US)

( * ) Notice: Subject to any disclaimer, the term of this patent is extended or adjusted under 35 U.S.C. 154(b) by 0 days.

(21) Appl. No.: 12/134,079

(22) Filed: Jun. 5, 2008

(65) Prior Publication Data

US 2008/0302217 A1    Dec. 11, 2008

Related U.S. Application Data

(60) Provisional application No. 60/942,706, filed on Jun. 8, 2007.

(51) Int. Cl.
  *B25B 7/12* (2006.01)
  *B21F 9/00* (2006.01)
(52) U.S. Cl. ............... 81/302; 81/318; 81/484; 254/237; 254/247
(58) Field of Classification Search .......... 254/237, 254/238, 240, 246, 247; 81/302, 324, 342, 81/484–486, 318–323
See application file for complete search history.

(56) References Cited

U.S. PATENT DOCUMENTS

| | | | | | |
|---|---|---|---|---|---|
| 326,909 | A | * | 9/1885 | Kricker | 7/126 |
| 2,439,785 | A | * | 4/1948 | Feitl et al. | 29/229 |
| 2,656,597 | A | * | 10/1953 | Meirion | 29/221 |
| 3,619,890 | A | * | 11/1971 | Kubokawa | 29/229 |
| 4,476,750 | A | * | 10/1984 | Murphy | 81/300 |
| 4,621,401 | A | * | 11/1986 | Anderson | 29/229 |
| 4,625,379 | A | * | 12/1986 | Anderson | 29/229 |
| 4,658,489 | A | * | 4/1987 | Johnston | 29/268 |
| 4,754,746 | A | * | 7/1988 | Cox | 600/210 |
| 4,790,056 | A | * | 12/1988 | Anderson | 29/229 |
| 5,074,175 | A | * | 12/1991 | Earle | 81/302 |
| 5,174,177 | A | * | 12/1992 | Jeromson et al. | 81/486 |
| 6,257,105 | B1 | * | 7/2001 | Lin | 81/302 |
| 6,648,313 | B2 | * | 11/2003 | Navarro | 269/6 |
| 6,973,859 | B2 | * | 12/2005 | Noniewicz | 81/320 |
| 7,007,357 | B2 | * | 3/2006 | Nakamoto | 29/229 |
| 2003/0041702 | A1 | * | 3/2003 | Kang | 81/302 |
| 2004/0129388 | A1 | * | 7/2004 | Brazil | 157/1.3 |
| 2004/0238582 | A1 | * | 12/2004 | Pedrini | 224/519 |

* cited by examiner

*Primary Examiner* — Evan H Langdon
(74) *Attorney, Agent, or Firm* — Zilka-Kotab, PC

(57) ABSTRACT

A tool for creating tension of a chain on a cycle according to one embodiment comprises a wheel engaging portion; a frame engaging portion positioned opposite the wheel engaging portion; and at least one handle operatively coupled to the wheel engaging portion and the frame engaging portion such that application of force on the at least one handle is operative to bias the wheel engaging portion and frame engaging portion away from each other. A tool for creating tension of a chain on a cycle according to another embodiment includes a wheel engaging portion; a frame engaging portion positioned opposite the wheel engaging portion, the frame engaging portion includes an arcuate section for engaging a frame of a cycle; a pivoting member coupled to the frame engaging portion for engaging the frame of the cycle; one handle operatively coupled to the wheel engaging portion; another handle operative coupled to the frame engaging portion such that application of force on the handles is operative to bias the wheel engaging portion and frame engaging portion away from each other; and a locking mechanism for maintaining relative positions of the wheel engaging portion and the frame engaging portion during use of the tool.

17 Claims, 5 Drawing Sheets

CHAIN TENSION TOOL

RELATED APPLICATIONS

This application claims priority to U.S. Provisional Patent Application Ser. No. 60/942,706, filed Jun. 8, 2007, which is herein incorporated by reference.

FIELD OF THE INVENTION

The present invention relates to tools, and more particularly, this invention relates to a chain tension tool.

SUMMARY

A tool for creating tension of a chain on a cycle according to one embodiment comprises a wheel engaging portion; a frame engaging portion positioned opposite the wheel engaging portion; and at least one handle operatively coupled to the wheel engaging portion and the frame engaging portion such that application of force on the at least one handle is operative to bias the wheel engaging portion and frame engaging portion away from each other.

A tool for creating tension of a chain on a cycle according to another embodiment includes a wheel engaging portion; a frame engaging portion positioned opposite the wheel engaging portion, the frame engaging portion includes an arcuate section for engaging a frame of a cycle; a pivoting member coupled to the frame engaging portion for engaging the frame of the cycle; one handle operatively coupled to the wheel engaging portion; another handle operative coupled to the frame engaging portion such that application of force on the handles is operative to bias the wheel engaging portion and frame engaging portion away from each other; and a locking mechanism for maintaining relative positions of the wheel engaging portion and the frame engaging portion during use of the tool.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treaties, etc.

It must also be noted that, as used in the specification and the appended claims, the singular forms "a," "an" and "the" include plural referents unless otherwise specified.

In one general embodiment, a tool for creating tension of a chain on a cycle according to one embodiment comprises a wheel engaging portion; a frame engaging portion positioned opposite the wheel engaging portion; and at least one handle operatively coupled to the wheel engaging portion and the frame engaging portion such that application of force on the at least one handle is operative to bias the wheel engaging portion and frame engaging portion away from each other.

In another general embodiment, a tool for creating tension of a chain on a cycle according to another embodiment includes a wheel engaging portion; a frame engaging portion positioned opposite the wheel engaging portion, the frame engaging portion includes an arcuate section for engaging a frame of a cycle; a pivoting member coupled to the frame engaging portion for engaging the flame of the cycle; one handle operatively coupled to the wheel engaging portion; another handle operative coupled to the frame engaging portion such that application of force on the handles is operative to bias the wheel engaging portion and frame engaging portion away from each other; and a locking mechanism for maintaining relative positions of the wheel engaging portion and the frame engaging portion during use of the tool.

The tool described herein is designed to aid the placement of a cycle's rear wheel in relation to tension of the chain, and is particularly useful for repositioning the wheel and/or creating tension in the chain when adjusting the wheel after the wheel has been loosened and/or removed. The tool may be used, for example, with BMX style bicycles/frames, beach cruiser style bicycles/frames and any other style of variable position dropout bicycles/frames. The tool may also be used with motorcycles.

Figure 1:
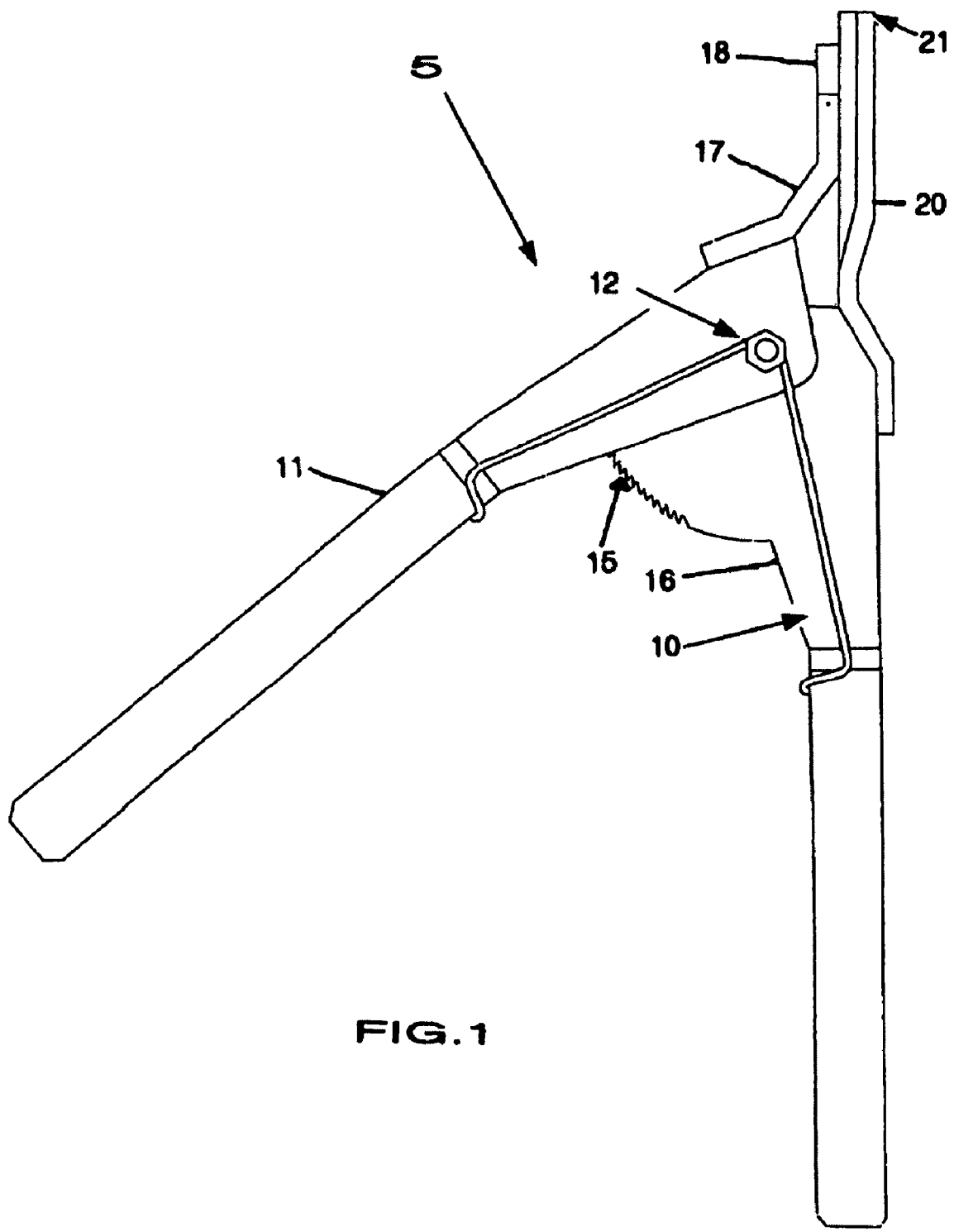
FIG. 1 is a schematic side view of a tool according to one embodiment.
Figure 2:
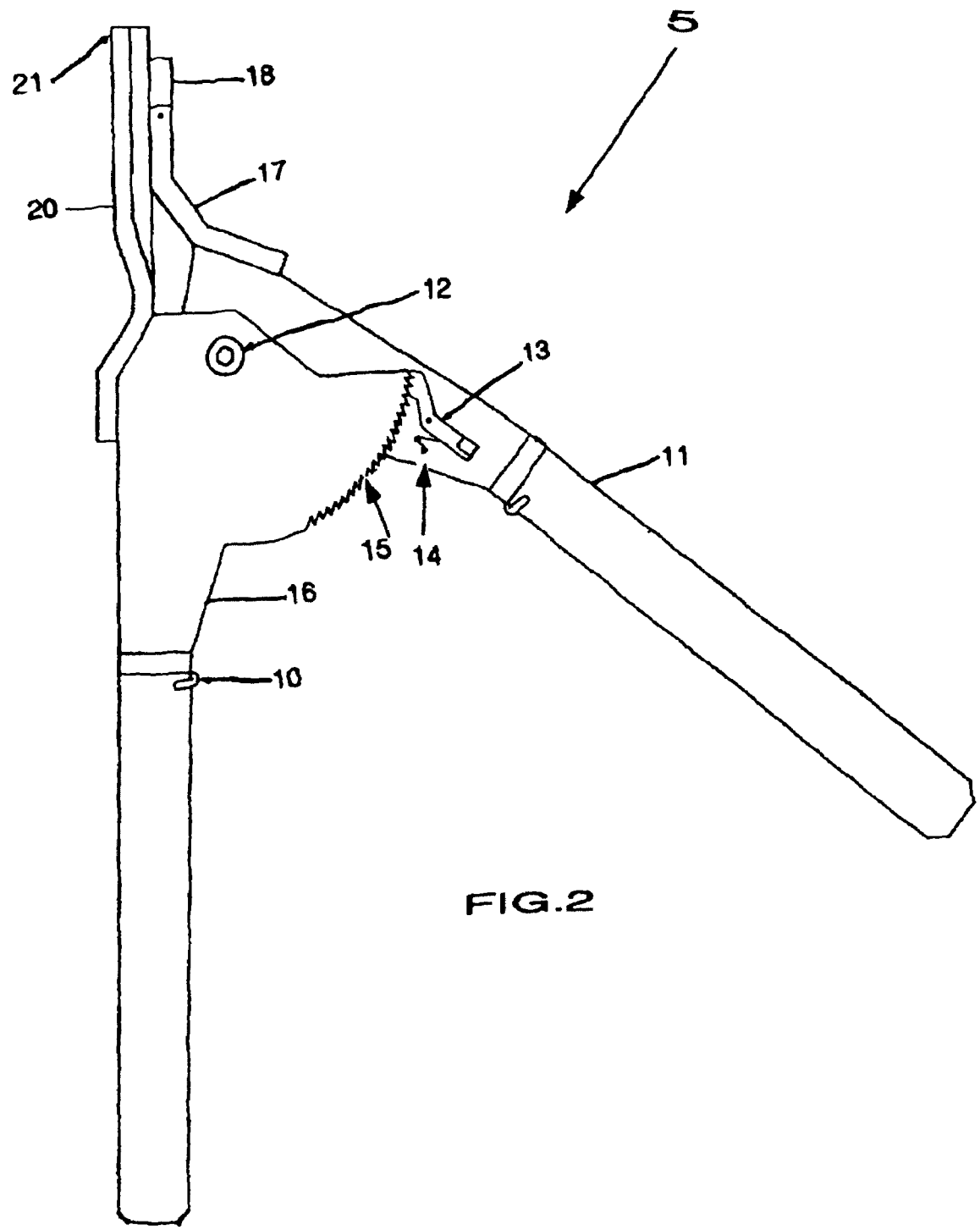
FIG. 2 is a schematic side view of a tool according to one embodiment.
Figure 3A:
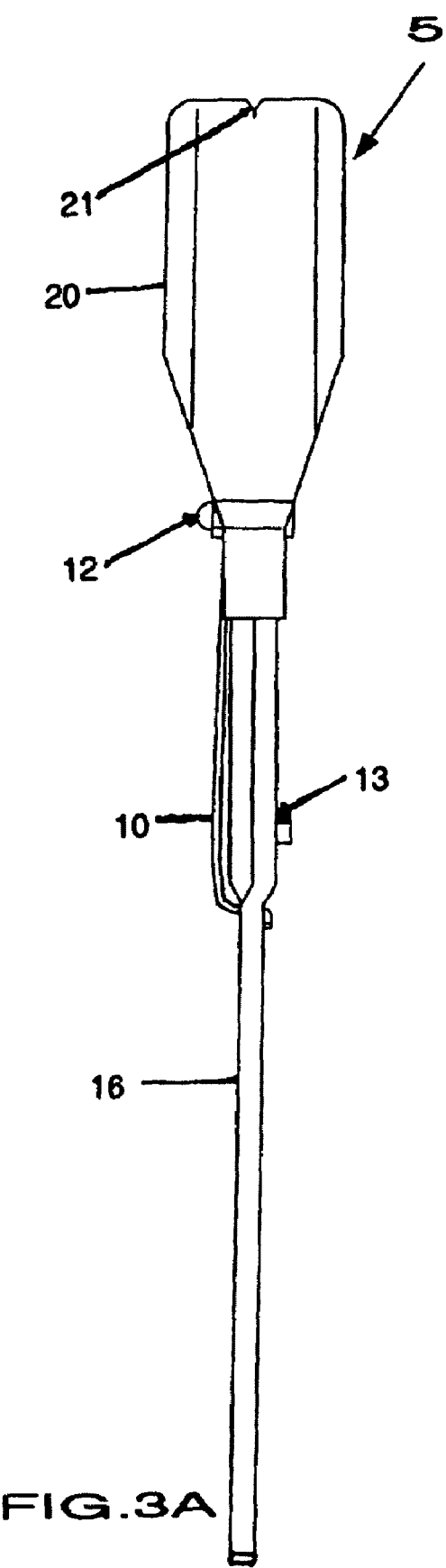
FIGS. 3A and 3B are schematic side views of a tool according to one embodiment.
Figure 3B:
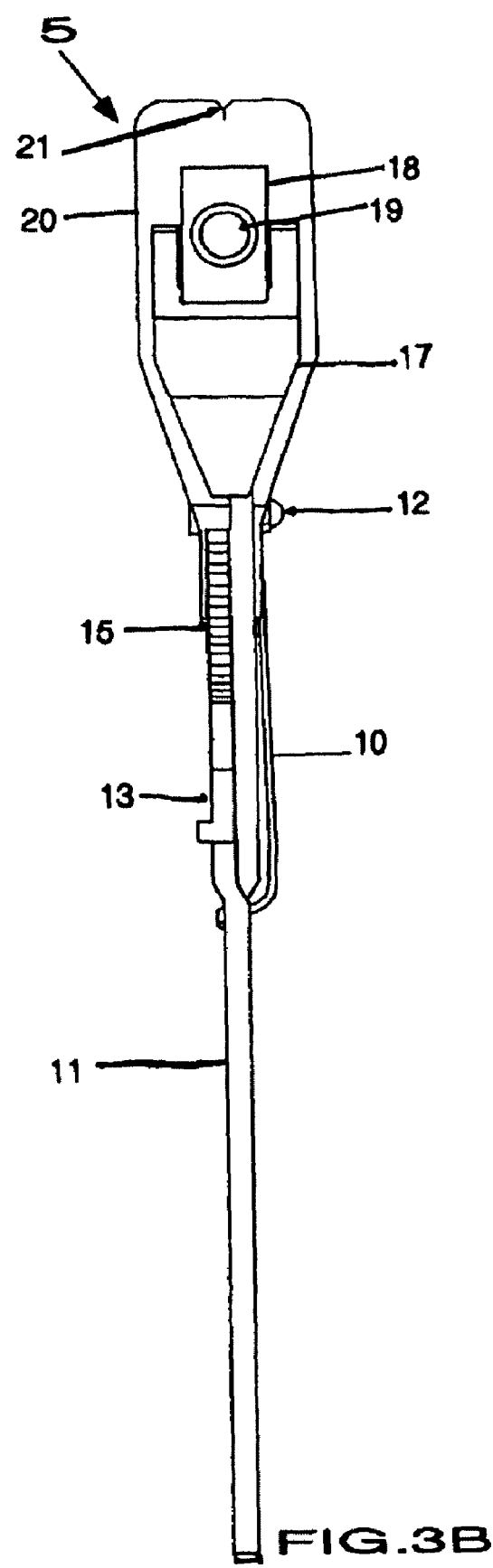
Figure 4:
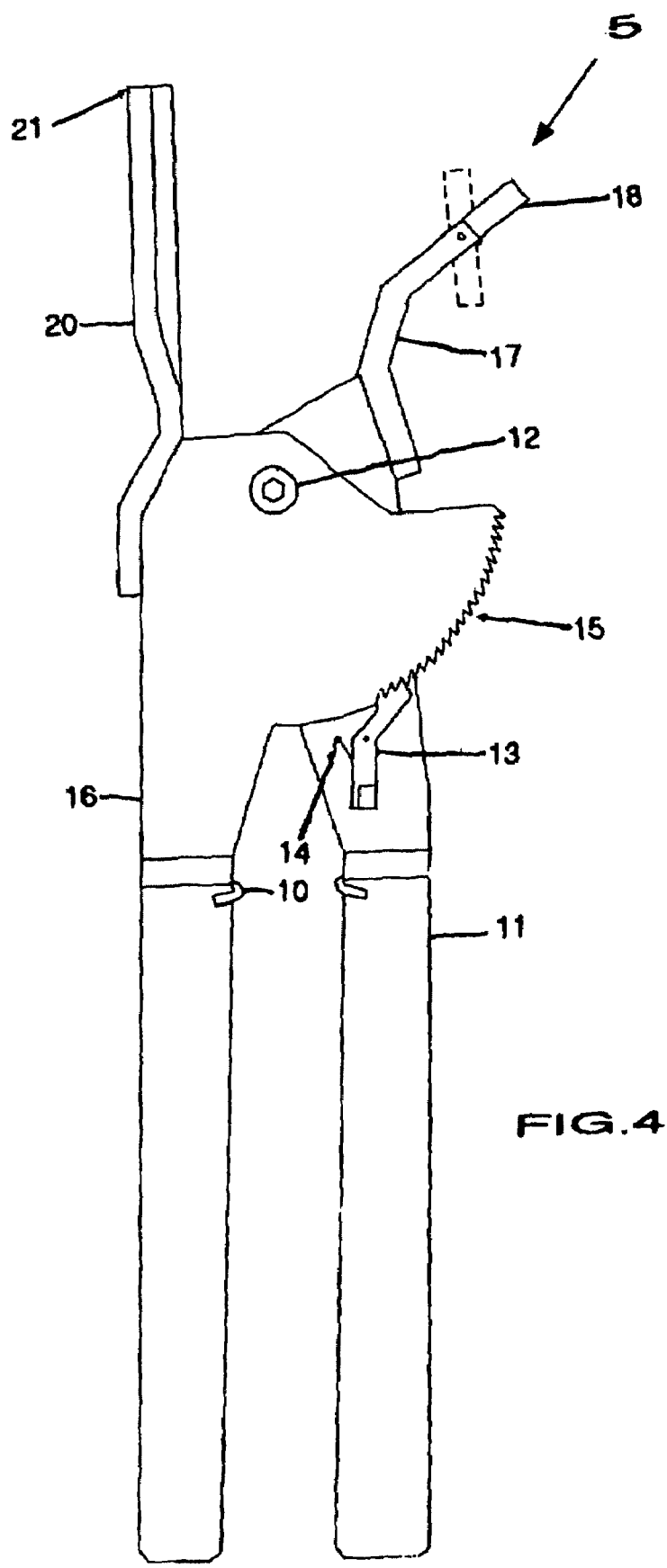
FIG. 4 is a schematic side view of a tool according to one embodiment.
Figure 5:
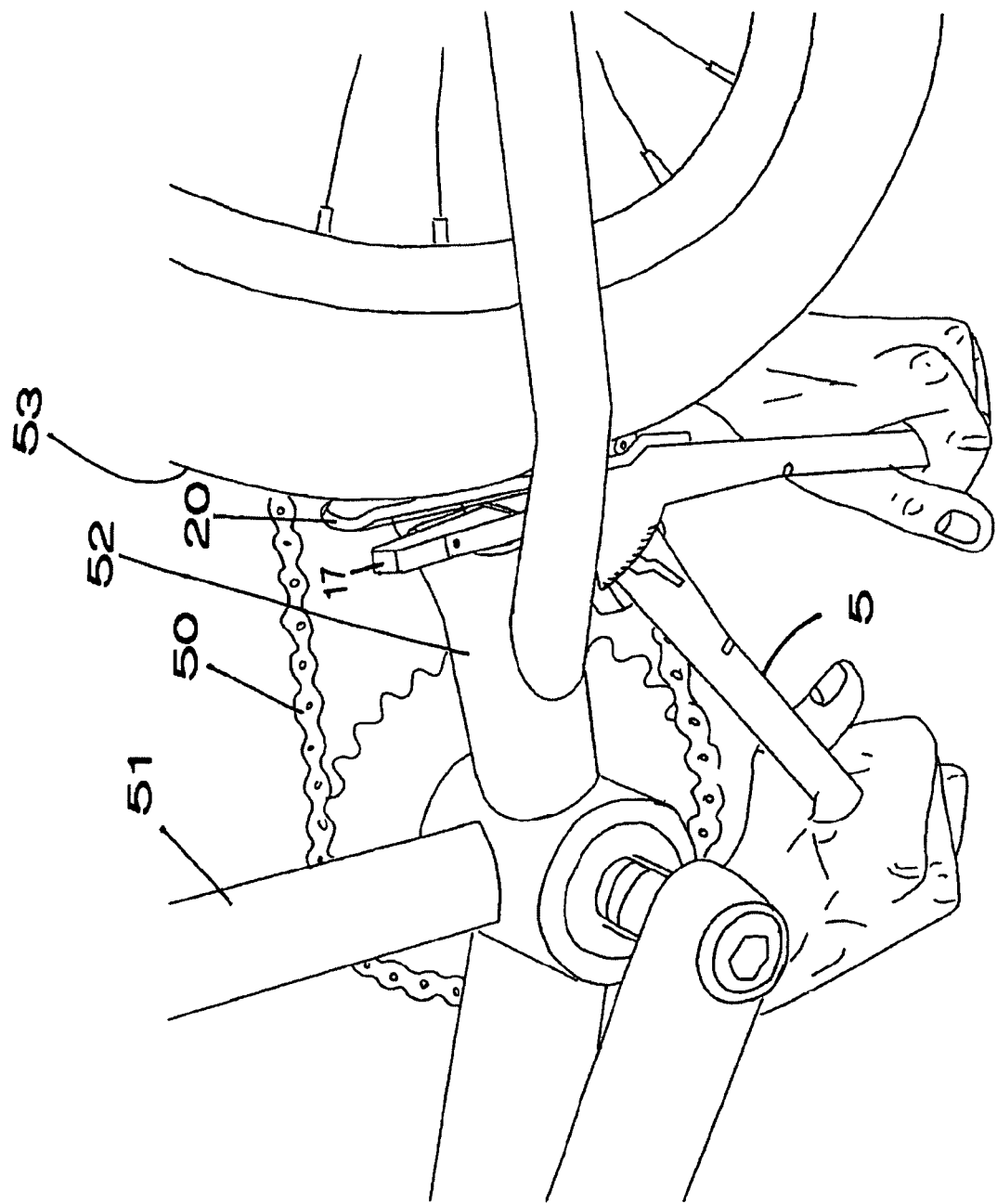
FIG. 5 is a perspective view of a tool in use according to one embodiment.

FIGS. 1 and 2 show opposite side views of a tool 5 according to one embodiment. FIGS. 3 and 4 show opposite ends of the tool 5. FIG. 5 illustrates the tool 5 in use.

With reference to FIGS. 1-5, a tool 5 for creating tension of a chain 50 on a cycle 51 in one embodiment includes a wheel engaging portion 20; a frame engaging portion 17 positioned opposite the wheel engaging portion 20; and at least one handle 11 or 16 operatively coupled to the wheel engaging portion 20 and the frame engaging portion 17 such that the application of force on the at least one handle is operative to bias the wheel engaging portion 20 and frame engaging portion 17 away from each other.

In a preferred embodiment, the tool 5 includes two handles 11, 16 that pivot about a pivot point 12 and operates similar to a pair of pliers. Note that the tool 5 can be configured to spread the wheel engaging portion 20 and frame engaging portion 17 when the handles 11, 16 are biased toward each other or away from each other.

With continued reference to FIGS. 1-5, the handles 11, 16 may be offset for ease in hand positioning due to the presence of the rear wheel 53, but they may also be centered, curved or straight as in FIG. 3. Also, the handles 11, 16 may be coated in vinyl, rubber, or some other surface for comfort and grip.

In a version of the tool 5 particularly useful with a beach cruiser with a rear fender, an optional self-centering, pivoting member 18 located on the frame engaging portion 17 of the tool 5 may engage the bolt that attaches the fender to the frame in order to protect the fender.

A hole 19 or groove, e.g., ¼ to ¾ inch wide, is preferably machined in or through the pivoting member 18 so as to accommodate a fender bolt on a bicycle that would have one. Preferably, the entire face of the tool 5 that is to be in contact with the frame is covered by a protective surface (rubber, urethane, plastic, or similar substance), in order to avoid scratches of the paint/metal.

With reference to FIG. 5, in one mode of use for the tool 5, the wheel engaging portion 20 and frame engaging portion 17 are inserted between the front, wishbone area 52 of the chain stay and the tire 53.

Once the tool 5 is in the appropriate position for the bicycle in service, the wheel engaging portion 20 and frame engaging portion 17 are spread apart to the appropriate amount, resulting in the chain tension desired.

On a BMX bike, beach cruiser without a rear fender, or other type of bicycle with a variable position dropout, the standard position for the tool 5 would be the lower portion of the frame engaging portion 17, typically on the crook of the tool 5, although a style may be utilized in which a self-centering surface, cupped, platform or other style may be used.

A small center-mark 21 may optionally be inscribed, cut, or painted, or by another method put on the wheel engaging portion 20, for ease of centering the tool 5 in relation to the tire. The wheel engaging portion 20 of the tool 5 may have a long, arcuate cross-sectional shape (e.g., a c-shaped or u-shaped cross-sectional shape which wraps around the tire toward the sidewalls, dished, cupped, etc.) flat, having angled segments, or with some other shape. Note that the frame engaging portion 17 may have a portion that is arcuate (e.g., c-shaped, u-shaped, dished, cupped, curled, etc.) flat, having angled segments, or with some other shape.

An optional locking mechanism is preferably included to selectively maintain the relative positions of the wheel engaging portion 20 and frame engaging portion 17 during use. A preferred locking mechanism incorporates a ratchet 15 and pawl 13 that engages the ratchet, though other types of locking mechanisms may be used such as frictional locking mechanisms, lock and key, etc. As best seen in FIG. 2, the pawl 13 may be biased with a spring assembly 14 towards (or away from) the ratchet 15.

Where a ratchet locking mechanism is used, once the tool 5 is spread apart, the tool 5 can be released totally and will maintain its position. It will not fall out, nor release tension on the chain. This enables the operator to tighten the axle nuts on the rear wheel evenly while making sure that the wheel is centered in the dropouts relative to the overall presence of the frame. When the operator wishes to remove the tool 5, the pawl 13 can be released, and the tool 5 will release.

An optional spring tension aid 10 may be connected to the handles 11, 16 to bias the handles apart as shown, or together.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tool for creating tension of a chain on a cycle, comprising:
    a wheel engaging portion;
    a frame engaging portion positioned opposite the wheel engaging portion; and
    at least one handle operatively coupled to the wheel engaging portion and the frame engaging portion such that application of force on the at least one handle is operative to bias the wheel engaging portion and frame engaging portion away from each other,
    wherein the wheel engaging portion has an arcuate portion having an arcuate cross section along a plane oriented perpendicular to a longitudinal axis of the wheel engaging portion extending between the at least one handle and an end of the wheel engaging portion positioned farthest from the at least one handle, the arcuate portion of the wheel engaging portion being for engaging a wheel of a cycle.

2. A tool as recited in claim 1, wherein the tool includes two handles, wherein a first of the handles is immovably coupled to the wheel engaging portion, wherein the first handle has an outer side that faces away from a second of the handles, wherein the outer side of the first handle does not extend past a plane extending across an outer side of the wheel engaging portion in a direction away from the second handle, the outer side of the wheel engaging portion facing in about the same direction as the outer side of the first handle.

3. A tool as recited in claim 1, wherein the frame engaging portion includes an arcuate section for engaging a frame of a cycle.

4. A tool as recited in claim 1, wherein the frame engaging portion includes a pivoting member for engaging a frame of a cycle, an axis of pivot of the pivoting member being about perpendicular to an axis of the frame engaging portion defined between the at least one handle and an end of the frame engaging portion farthest from the at least one handle.

5. A tool as recited in claim 4, wherein the pivoting member includes a surface coating adapted for reducing scratching of the frame of the cycle.

6. A tool as recited in claim 4, wherein the pivoting member includes a hole for receiving a nut of the cycle.

7. A tool as recited in claim 1, wherein the wheel engaging portion includes a center-mark.

8. A tool as recited in claim 1, further comprising a locking mechanism for maintaining relative positions of the wheel engaging portion and the frame engaging portion during use of the tool.

9. A tool as recited in claim 8, wherein the locking mechanism includes a ratchet mechanism and a pawl.

10. A tool for creating tension of a chain on a cycle, comprising:
    a wheel engaging portion;
    a frame engaging portion positioned opposite the wheel engaging portion, the frame engaging portion includes an arcuate section for engaging a frame of a cycle;
    a pivoting member coupled to the frame engaging portion for engaging the frame of the cycle, an axis of pivot of the pivoting member being about perpendicular to an axis of the frame engaging portion defined between the at least one handle and an end of the frame engaging portion farthest from the at least one handle;
    a first handle operatively coupled to the wheel engaging portion;
    a second handle operative coupled to the frame engaging portion such that application of force on the handles is operative to bias the wheel engaging portion and frame engaging portion away from each other; and
    a locking mechanism for maintaining relative positions of the wheel engaging portion and the frame engaging portion during use of the tool,
    wherein the wheel engaging portion has an arcuate portion having an arcuate cross section as viewed perpendicular to an axis of the wheel engaging portion extending between the first handle and an end of the wheel engaging portion farthest from the first handle, the arcuate portion of the wheel engaging portion being for engaging a wheel of a cycle.

11. A tool as recited in claim 10, wherein the pivoting member includes a surface coating adapted for reducing scratching of the frame of the cycle.

12. A tool as recited in claim 10, wherein the pivoting member includes a hole for receiving a nut of the cycle.

13. A tool as recited in claim 10, wherein the locking mechanism includes a ratchet mechanism and a pawl.

14. A tool as recited in claim 10, wherein the wheel engaging portion includes a center-mark.

15. A tool as recited in claim 10, wherein the first handle is fixedly coupled to the wheel engaging portion and the second handle is fixedly coupled to the frame engaging portion, wherein the first and second handle have only a single pivot point.

16. A tool as recited in claim 1, wherein the first handle is fixedly coupled to the wheel engaging portion and the second handle is fixedly coupled to the frame engaging portion, wherein the first and second handle have only a single pivot point.

17. A tool for creating tension of a chain on a cycle, comprising:
   a wheel engaging portion;
   a frame engaging portion positioned opposite the wheel engaging portion;
   a pivoting member coupled to the frame engaging portion for engaging the frame of the cycle, an axis of pivot of the pivoting member being perpendicular to an axis of the frame engaging portion defined between a first handle and an end of the frame engaging portion farthest from the at least one handle; and
   the first handle operatively coupled to the wheel engaging portion and the frame engaging portion such that application of force on the first handle toward a second handle is operative to bias the wheel engaging portion and frame engaging portion away from each other.

\* \* \* \* \*